(12) United States Patent
Takahashi et al.

(10) Patent No.: US 12,384,934 B2
(45) Date of Patent: Aug. 12, 2025

(54) SURFACE TREATMENT AGENT FOR SOFT CONTACT LENS

(71) Applicant: NOF CORPORATION, Shibuya-ku (JP)

(72) Inventors: Masatomo Takahashi, Oita (JP); Shunsuke Sakurai, Yokosuka (JP); Hiroko Kawasaki, Kawasaki (JP); Takanori Fujita, Oita (JP)

(73) Assignee: NOF CORPORATION, Shibuya-ku (JP)

(*) Notice: Subject to any disclaimer, the term of this patent is extended or adjusted under 35 U.S.C. 154(b) by 611 days.

(21) Appl. No.: 17/766,428

(22) PCT Filed: Oct. 7, 2020

(86) PCT No.: PCT/JP2020/037995
§ 371 (c)(1),
(2) Date: Apr. 4, 2022

(87) PCT Pub. No.: WO2021/070862
PCT Pub. Date: Apr. 15, 2021

(65) Prior Publication Data
US 2023/0220234 A1 Jul. 13, 2023

(30) Foreign Application Priority Data
Oct. 9, 2019 (JP) ................. 2019-185732

(51) Int. Cl.
| C09D 143/02 | (2006.01) |
| C08F 230/02 | (2006.01) |
| C08G 81/02 | (2006.01) |
| G02C 7/04 | (2006.01) |

(52) U.S. Cl.
CPC .......... C09D 143/02 (2013.01); C08F 230/02 (2013.01); C08G 81/021 (2013.01); G02C 7/049 (2013.01)

(58) Field of Classification Search
CPC .. C09D 143/02; C09D 123/36; C09D 157/12; C09D 123/32; C08F 230/02; C08F 8/30; C08F 8/32; C08F 16/28; C08F 18/22; C08F 20/34; C08F 213/1458; C08G 81/021; G02C 7/049
See application file for complete search history.

(56) References Cited

U.S. PATENT DOCUMENTS

| 2003/0190405 A1 | 10/2003 | Bowers et al. |
| 2004/0176556 A1 | 9/2004 | Bowers et al. |
| 2012/0026457 A1 | 2/2012 | Qiu et al. |
| 2019/0179055 A1* | 6/2019 | Qiu .......... G02B 1/18 |
| 2019/0263971 A1 | 8/2019 | Zhang et al. |

FOREIGN PATENT DOCUMENTS

| CN | 109796616 A | 5/2019 |
| JP | 7-502053 A | 3/1995 |
| JP | 2012-508902 A | 4/2012 |
| JP | 2013-533518 A | 8/2013 |
| JP | 2017-115005 A | 6/2017 |
| JP | 2017-146334 A | 8/2017 |
| WO | WO 2019/111838 A1 | 6/2019 |

OTHER PUBLICATIONS

JP2017146334A machine translation (Year: 2017).*
Extended European Search Report issued Oct. 10, 2023 in European Patent Application No. 20875453.1, citing references 1 & 2 therein, 6 pages.
International Search Report mailed on Dec. 22, 2020 in PCT/JP2020/037995 filed on Oct. 7, 2020, citing references AA-AB, and AO-AS, therein, 2 pages.
Walline J. J. et al., "Long-term Contact Lens Wear of Children and Teens", Eye & Contact Lens, vol. 39, No. 4, 2013, pp. 283-289.

* cited by examiner

*Primary Examiner* — Mark Eashoo
*Assistant Examiner* — Caitlin Norine Illing
(74) *Attorney, Agent, or Firm* — Oblon, McClelland, Maier & Neustadt, L.L.P.

(57) ABSTRACT

The present invention relates to a surface treatment agent for soft contact lens, containing a reaction product obtained through a reaction between a poly(meth)acrylic acid which has an average molecular weight of 1,000 to 2,000,000, and a copolymer (P) which is obtained through polymerization of a specified hydrophilic monomer ($n_A$) and a specified reactive monomer ($n_B$), wherein in the copolymer, the hydrophilic monomer ($n_A$) is 80 to 99 mol %, the reactive monomer ($n_B$) is 1 to 20 mol %, and a weight average molecular weight is 10,000 to 5,000,000. The surface treatment agent tremendously enhances surface hydrophilicity of a soft contact lens to improve discomfort.

2 Claims, No Drawings

SURFACE TREATMENT AGENT FOR SOFT CONTACT LENS

TECHNICAL FIELD

The present invention relates to a surface treatment agent for soft contact lens, containing a reaction product obtained through a reaction of two different kinds of polymers each having a specified structure.

BACKGROUND ART

The number of soft contact lens wearers in Japan is estimated to exceed 10 million, and the number of wearers has increased rapidly due to its ease and convenience. However, due to its ease and convenience, it has been reported that wearing soft contact lenses for a long time is proceeding mainly among young people (NPL 1). Due to the prolonged wearing of soft contact lenses, problems are the lack of oxygen to the cornea due to wearing of soft contact lenses and the discomfort caused by wearing them.

It has been become possible to increase the supply of oxygen to the cornea by blending a material having a functional group with excellent oxygen permeation, such as a silicone monomer, with the material constituting the soft contact lens, and the technical development regarding a blending formulation or a production method of soft contact lenses with excellent oxygen permeation has been performed (PTL 1, etc.). However, the silicone monomer having excellent oxygen permeability has extremely high hydrophobicity, and as a result, it gives a feeling of dryness and discomfort to the soft contact lens. For this reason, technological developments have been made for making the surface of contact lens hydrophilic for silicone hydrogel contact lens having a silicone monomer blended therewith.

As such technologies, for example, it may be considered that a silicone hydrogel contact lens is blended with a hydrophilic monomer having a carboxy group, such as methacrylic acid and acrylic acid, or the like. However, in the case of simultaneously blending a silicone monomer and a monomer having a carboxy group, the hydrolysis reaction of the polymer in the contact lens is increased so that the stability with time is not excellent. Thus, it is the current situation that the foregoing technology has not been put into practical use.

As another technology, there is also developed the technology in which a copolymer having both a functional group with high reactivity, such as an amino group, an epoxy group, and a thiol group, and a hydrophilic group and a silicone hydrogel contact lens having a functional group with high reactivity are produced in advance, and these reactive groups are chemical bound with each other, to give hydrophilicity to the surface of contact lens (PTL 2). However, highly controlled production equipment is needed, resulting in an economic disadvantage, and due to formation of a hydrophilic layer on the surface of contact lens, there is considered a concern that the oxygen permeability is rather lowered. Thus, it was the situation that application to products does not thoroughly proceed.

In the light of the above, the development of surface treatment technology for the purpose of providing a silicone hydrogel contact lens with an excellent wearing feeling by bringing about favorable hydrophilicity has been demanded.

CITATION LIST

Patent Literature

PTL 1: JP 2017-115005 A
PTL 2: JP 2012-508902 A

Non-Patent Literature

NPL 1: Walline J. J., 2013, Long-term Contact Lens Wear of Children and Teens, Eye & Contact Lens, 39, pp. 283-289

SUMMARY OF INVENTION

Technical Problem

A problem of the present invention is to provide a surface treatment agent for soft contact lens capable of tremendously enhancing surface hydrophilicity of a soft contact lens to improve discomfort.

Solution to Problem

In order to solve the aforementioned problem, the present inventors made extensive and intensive investigations. As a result, they have found a technology in which by using a surface treatment agent for soft contact lens, containing a reaction product obtained through a reaction between a poly(meth)acrylic acid and a copolymer (P) having two different kinds of structural units in a specified proportion, extremely excellent surface hydrophilicity is simply given to the surface of soft contact lens to reduce a feeling of dryness, thereby leading to accomplishment of the present invention.

Specifically, the surface treatment agent for soft contact lens of the present invention is as follows.

[1] A surface treatment agent for soft contact lens, containing a reaction product obtained through a reaction between the following poly(meth)acrylic acid and the following copolymer (P):

Poly(meth)acrylic acid: a poly(meth)acrylic acid having an average molecular weight of 1,000 to 2,000,000, and Copolymer (P): a copolymer obtained through polymerization of a hydrophilic monomer ($n_A$) represented by the formula (1) and a reactive monomer ($n_B$) represented by the formula (2), wherein in the copolymer, the hydrophilic monomer ($n_A$) is 80 to 99 mol %, the reactive monomer ($n_B$) is 1 to 20 mol %, and a weight average molecular weight is 10,000 to 5,000,000.

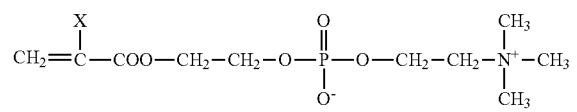

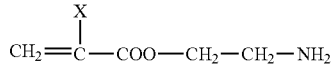

In the formula (1) and the formula (2), X represents a hydrogen atom or a methyl group.

[2] The surface treatment agent for soft contact lens as set forth above in [1], which is for a silicon hydrogel contact lens.

Advantageous Effects of Invention

By using the surface treatment agent for soft contact lens of the present invention, an extremely excellent surface hydrophilicity may be given, and a feeling of dryness and discomfort may be reduced.

DESCRIPTION OF EMBODIMENTS

The present invention is hereunder described in detail.

The surface treatment agent for soft contact lens of the present invention is a surface treatment agent for soft contact lens, containing a reaction product obtained through a reaction between the following poly(meth)acrylic acid and the following copolymer (P).

Poly(meth)acrylic acid: a poly(meth)acrylic acid having an average molecular weight of 1,000 to 2,000,000, and Copolymer (P): a copolymer obtained through polymerization of a hydrophilic monomer ($n_A$) represented by the formula (1) and a reactive monomer ($n_B$) represented by the formula (2), wherein in the copolymer, the hydrophilic monomer ($n_A$) is 80 to 99 mol %, the reactive monomer ($n_B$) is 1 to 20 mol %, and a weight average molecular weight is 10,000 to 5,000,000.

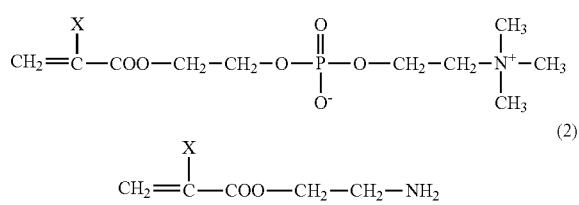

In the formula (1) and the formula (2), X represents a hydrogen atom or a methyl group.

In this specification, the "poly(meth)acrylic acid" means "polyacrylic acid or polymethacrylic acid", and the same is also applicable to other analogous terminologies.

In this specification, when preferred numerical value ranges (for example, the ranges of a concentration or a weight average molecular weight) are described in stages, the respective lower limit values and upper limit values may be independently combined with each other. For example, in the description: "preferably 10 or more, and more preferably 20 or more, and preferably 100 or less, more preferably 90 or less", the "preferred lower limit value: 10" and the "more preferred upper limit value: 90" may be combined to take a range of "10 or more and 90 or less". For example, in the description: "preferably 10 to 100, and more preferably 20 to 90", a range of "10 to 90" may be similarly obtained.

<Poly(Meth)Acrylic Acid>

Examples of the poly(meth)acrylic acid that is used for production of a reaction product contained in the surface treatment agent for soft contact lens of the present invention include polyacrylic acid and polymethacrylic acid, with polyacrylic acid being preferred.

The average molecular weight of the poly(meth)acrylic acid that is used for the surface treatment agent for soft contact lens of the present invention is 1,000 to 2,000,000, and preferably 5,000 to 1,000,000. Here, the aforementioned average molecular weight means a weight average molecular weight measured by the gel permeation chromatography (GPC).

The copolymer (P) that is used for production of the reaction product to be contained in the surface treatment agent for soft contact lens of the present invention is obtained through polymerization of a hydrophilic monomer ($n_A$) represented by the following formula (1) and a reactive monomer ($n_B$) represented by the following formula (2). The hydrophilic monomer ($n_A$) in the copolymer (P) is 80 to 99 mol %, and the reactive monomer ($n_B$) in the copolymer (P) is 1 to 20 mol %. In detail, the hydrophilic monomer ($n_A$) in the copolymer (P) means a structural unit on a basis of the hydrophilic monomer ($n_A$) in the copolymer (P), and the reactive monomer ($n_B$) in the copolymer (P) means a structural unit on a basis of the reactive monomer ($n_R$) in the copolymer (P). The mol % of each of the structural units in the copolymer (P) may be adjusted by a charge ratio of each of the monomers. Therefore, the copolymer (P) is obtained through polymerization of 80 to 99 mol % of the hydrophilic monomer ($n_A$) represented by the following formula (1) and 1 to 20 mol % of the reactive monomer ($n_B$) represented by the following formula (2), and the weight average molecular weight thereof is 10,000 to 5,000,000.

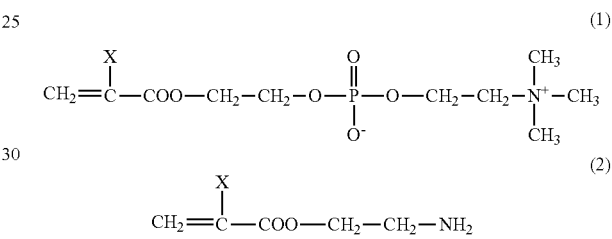

[Hydrophilic Monomer ($n_A$) Represented by Formula (1)]

The copolymer (P) that is used in the present invention has the hydrophilic monomer ($n_A$) represented by the formula (1), namely a monomer having a phosphorylcholine structure (hereinafter also referred to simply as "hydrophilic monomer ($n_A$)). In view of the fact that the copolymer (P) has the hydrophilic monomer ($n_A$), hydrophilicity is given to the copolymer (P), whereby excellent hydrophilicity may be given to the surface of soft contact lens.

The hydrophilic monomer ($n_A$) is a 2-((meth)acryloyloxy)ethyl-2-(trimethylammonio)ethyl phosphate, and preferably 2-(methacryloyloxy)ethyl-2-(trimethylammonio)ethyl phosphate (hereinafter also referred to as "2-methacryloyloxyethyl phosphorylcholine") represented by the formula (1').

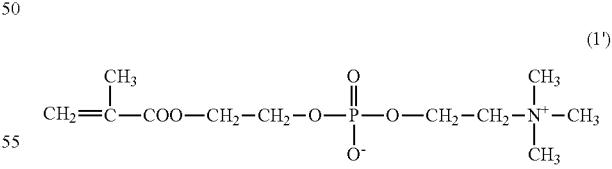

The content of the hydrophilic monomer ($n_A$) in the copolymer (P) is 80 to 99 mol %. When the content is less than 80 mol %, the effect for enhancing the hydrophilicity on the surface of soft contact lens may not be expected, whereas when the content is more than 99 mol %, the amount of the reactive monomer ($n_B$) represented by the formula (2) becomes relatively small, so that the chemical binding with the poly(meth)acrylic acid of the copolymer (P) is not expected, From the aforementioned viewpoint, the content of the hydrophilic monomer ($n_A$) in the copolymer (P) is preferably 85 mol % or more, more preferably 87 mol % or more, and still more preferably 95 mol % or less.

[Reactive Monomer ($n_B$) Represented by Formula (2)]

The copolymer (P) that is used in the present invention has the reactive monomer ($n_B$) represented by the formula (2). In view of the fact that the copolymer (P) has the reactive monomer ($n_B$) represented by the formula (2), it reacts with the poly(meth)acrylic acid to readily produce the reaction product.

The reactive monomer ($n_B$) represented by the formula (2) is a 2-aminoethyl (meth)acrylate, and preferably 2-aminoethyl methacrylate represented by the formula (2').

The amino group in the reactive monomer ($n_B$) represented by the formulae (2) and (2') may be a salt, such as a hydrochloride.

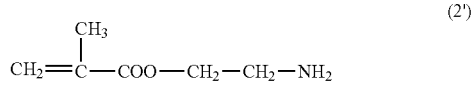

(2')

The content of the reactive monomer ($n_E$) in the copolymer (P) is 1 to 20 mol %. When the content is less than 1 mol %, the effect for reacting with the poly(meth)acrylic acid may not be expected, whereas when the content is more than 20 mol %, high hydrophilicity is not expected.

From the aforementioned viewpoint, the content of the reactive monomer ($n_B$) in the copolymer (P) is preferably 15 mol % or less, more preferably 13 mol % or less, and still more preferably 5 mol % or more.

As for a preferred combination of the respective monomers in the copolymer (P) that is used in the present invention, for example, the hydrophilic monomer ($n_A$) is a 2-(meth)acryloyloxyethyl phosphorylcholine, and the monomer ($n_B$) is a 2-aminoethyl (meth)acrylate.

When the respective monomers in the copolymer (P) take the aforementioned combination, excellent hydrophilicity and durability may be given to the surface of soft contact lens.

[Other Monomer]

Although the copolymer (P) may contain other monomer than the aforementioned hydrophilic monomer ($n_A$) and reactive monomer ($n_b$) within a range where the effects of the present invention are not impaired, the copolymer (P) is preferably a copolymer composed of only the aforementioned hydrophilic monomer ($n_A$) and reactive monomer ($n_b$).

Examples of the aforementioned other monomer include a polymerizable monomer selected from a linear or branched alkyl (meth)acrylate, a cyclic alkyl (meth)acrylate, an aromatic group-containing (meth)acrylate, a styrene-based monomer, a vinyl ether monomer, a vinyl ester monomer, a hydrophilic hydroxy group-containing (meth)acrylate, an acid group-containing monomer, and a nitrogen-containing group-containing monomer.

Examples of the linear or branched alkyl (meth)acrylate include methyl (meth)acrylate, ethyl (meth)acrylate, propyl (meth)acrylate, butyl (meth)acrylate, lauryl (meth)acrylate, and stearyl (meth)acrylate.

Examples of the cyclic alkyl (meth)acrylate include cyclohexyl (meth)acrylate.

Examples of the aromatic group-containing (meth)acrylate include benzyl (meth)acrylate and phenoxyethyl (meth)acrylate.

Examples of the styrene-based monomer include styrene, methylstyrene, and chlorostyrene.

Examples of the vinyl ether monomer include methyl vinyl ether and butyl vinyl ether.

Examples of the vinyl ester monomer include vinyl acetate and vinyl propionate.

Examples of the hydrophilic hydroxy group-containing (meth)acrylate include polyethylene glycol (meth)acrylate, polypropylene glycol (meth)acrylate, 2-hydroxyethyl (meth)acrylate, 2-hydroxybutyl (meth)acrylate, and 4-hydroxybutyl (meth)acrylate.

Examples of the acid group-containing monomer include (meth)acrylic acid and styrenesulfonic acid (meth)acryloyloxy phosphonic acid.

Examples of the nitrogen-containing group-containing monomer include N-vinylpyrrolidone.

In the case where the copolymer (P) contains the other monomer as the structural unit, a molar ratio [$N_A/N_X$] of the hydrophilic monomer ($n_A$) (molar number: $N_A$) to the other monomer (molar number: $N_X$) is 100/50 or less when the hydrophilic monomer ($n_A$) is taken as 100. In addition, in the case where the copolymer (P) contains the other monomer as the structural unit, a molar ratio of the respective structural units on a base of the hydrophilic monomer ($n_A$) (molar ratio: $N_A$) to the reactive monomer ($n_B$) (molar number $N_B$) to the other monomer (molar number: $N_X$) is preferably $N_A/N_B/N_X$=(50 to 99)/(1 to 50)/(1 to 50).

[Weight Average Molecular Weight of Copolymer (P)]

The weight average molecular weight of the copolymer (P) is 10,000 to 5,000,000, preferably 12,000 or more, still more preferably 14,000 or more, and yet still more preferably 16,000 or more, and preferably 4,000,000 or less, more preferably 3,000,000 or less, and still more preferably 2,000,000 or less. For example, the weight average molecular weight of the copolymer (P) may also be 18,000 to 1,500,000, 30,000 to 1,500,000, or 30,000 to 1,200,000.

When the weight average molecular weight is less than 10,000, there is a concern that it becomes difficult to separate impurities during production, whereas when the weight average molecular weight is more than 5,000,000, there is a concern that the viscosity increases so that it becomes difficult to perform filtration.

The weight average molecular weight of the copolymer (P) refers to a value measured by the gel permeation chromatography (GPC).

[Production Method of Copolymer (P)]

The copolymer (P) may be produced through polymerization of the aforementioned hydrophilic monomer ($n_A$) and reactive monomer ($n_B$) and the other monomer to be used, if desired. Although the copolymer (P) is typically a random copolymer, it may be an alternating copolymer or a block copolymer in which the respective monomers are regularly arranged, or may have a graft structure in a part thereof.

Specifically, for example, the copolymer (P) may be obtained by subjecting a mixture of the aforementioned respective monomers to radical polymerization in the presence of a radical polymerization initiator in an inert gas atmosphere, such as nitrogen, carbon dioxide, argon, and helium.

The radical polymerization method may be performed by a known method, such as block polymerization, suspension polymerization, emulsion polymerization, drop polymerization, and solution polymerization. From the viewpoint of purification, etc., the radical polymerization method is preferably drop polymerization or solution polymerization, and especially preferably drop polymerization.

The purification of the copolymer (P) may be performed by a known purification method, such as a reprecipitation method, a dialysis method, and an ultrafiltration method.

Examples of the radical polymerization initiator include an azo-based radical polymerization initiator, an organic peroxide, and a persulfate.

Examples of the azo-based radical polymerization initiator include 2,2'-azobis(2-diaminopropyl) dihydrochloride, 2,2'-azobis(2-(5-methyl-2-imidazolin-2-yl)propane) dihydrochloride, 4,4'-azobis(4-cyanovaleric acid), 2,2'-azobisisobutylamide dihydrate, 2,2'-azobis(2,4-dimethylvaleronitrile), and 2,2'-azobisisobutyronitrile (AIBN).

Examples of the organic peroxide include t-butyl peroxyneodecanate, benzoyl peroxide, diisopropyl peroxydicarbonate, t-butyl peroxy-2-ethylhexanoate, t-butyl peroxypivalate, t-butyl peroxyisobutyrate, lauroyl peroxide, t-butyl peroxydecanate, and succinic acid peroxide.

Examples of the persulfate include ammonium persulfate, potassium persulfate, and sodium persulfate.

These radical polymerization initiators may be used alone or in combination of two or more thereof. The used amount of the polymerization initiator is typically 0.001 to 10 parts by mass, preferably 0.02 to 5.0 parts by mass, and more preferably 0.03 to 3.0 parts by mass based on 100 parts by mass of a total of the respective monomers.

The synthesis of the copolymer (P) may be performed in the presence of a solvent. The solvent is not particularly restricted so long as it dissolves the composition of the respective monomers therein and does not adversely affect the reaction, and examples thereof include water, an alcohol-based solvent, a ketone-based solvent, an ester-based solvent, a linear or cyclic ether-based solvent, and a nitrogen-containing solvent.

Examples of the alcohol-based solvent include methanol, ethanol, n-propanol, and isopropanol.

Examples of the ketone-based solvent include acetone, methyl ethyl ketone, and diethyl ketone.

Examples of the ester-based solvent include ethyl acetate.

Examples of the linear or cyclic ether-based solvent include ethyl cellosolve and tetrahydrofuran.

Examples of the nitrogen-containing solvent include acetonitrile, nitromethane, and N-methylpyrrolidone.

Among these solvents, water or an alcohol-based solvent is preferably used.

<Production of Reaction Product>

The surface treatment agent for soft contact lens of the present invention contains the reaction product obtained through a reaction between the aforementioned poly(meth)acrylic acid and copolymer (P). The reaction between the poly(meth)acrylic acid and the copolymer (P) is preferably performed in the presence of a condensing agent.

Examples of the condensing agent include 1-ethyl-3-(3-dimethylaminopropyl)carbodiimide (EDC), N,N-dicyclohexylcarbodiimide (DCC), 1-cyclohexyl-3-(2-morpholinoethyl)carbodiimide, diisopropylcarbodiimide, and mixtures thereof.

It is preferred that the reaction product in the present invention is produced in a reaction solution. The foregoing reaction solution is a solution containing the aforementioned poly(meth)acrylic acid and copolymer (P) and a solvent. It is preferred that the foregoing reaction solution further contains the aforementioned condensing agent. In the foregoing reaction solution, the poly(meth)acrylic acid and the copolymer (P) react with each other to produce the reaction product. As the solvent, there is exemplified water, and besides the water, an alcohol, such as ethanol, n-propanol, and isopropanol, may also be contained. As the water, water that is typically used for medical and pharmaceutical products and medical instruments may be used. Specifically, ion exchange water, purified water, sterile purified water, distilled water, and water for injection may be used.

A concentration of the poly(meth)acrylic acid in the reaction solution is preferably 0.00001 w/v % to 1.0 w/v %, more preferably 0.001 w/v % to 0.8 w/v %, and still more preferably 0.1 w/v % to 0.6 w/v %. When the foregoing concentration is less than 0.00001 w/v %, the effect for surface treatment of soft contact lens may not be expected, whereas when it is more than 1.0 w/v %, there is a case where it takes time for dissolving the (meth)acrylic acid therein.

A concentration of the copolymer (P) in the reaction solution is preferably 0.05 w/v % to 4.0 w/v %, more preferably 0.1 w/v % to 2.0 w/v %, and still more preferably 0.2 w/v % to 1.0 w/v %. When the concentration of the copolymer (P) is the foregoing lower limit value or more, the effect for giving excellent hydrophilicity and durability thereof to the soft contact lens is readily obtained. When it is the foregoing upper limit value or less, the effect corresponding to the blending amount is obtained so that such is economically advantageous.

A concentration of the condensing agent in the reaction solution is preferably 0.05 w/v % to 1.0 w/v %, more preferably 0.1 w/v % to 0.8 w/v %, and still more preferably 0.2 w/v % to 0.6 w/v %.

It is preferred to contain a buffer agent in the reaction solution. A concentration of the buffer agent is preferably 0.0001 w/v % to 15.0 w/v %, more preferably 0.001 w/v % to 10.0 w/v %, and still more preferably 0.01 w/v % to 5.0 w/v %. Specific kinds of the buffer agent are mentioned later.

The concentration of each of the components in the reaction solution means the concentration of each of the components before the poly(meth)acrylic and the copolymer (P) commence the reaction.

In the present invention, the term "w/v %" expresses a mass of the certain component in 100 mL of the solution in terms of gram (g). For example, the wording "the solution of the present invention contains 1.0 w/v % of the copolymer (P)" means that the 100 mL of the solution contains 1.0 g of the copolymer (P).

A temperature during producing the reaction product in the reaction solution is, for example, 0 to 60° C., and preferably 10 to 50° C. In addition, a reaction time is, for example, 10 to 480 minutes, and preferably 60 to 360 minutes.

In the light of the above, the reaction product in the present invention may be produced. The foregoing reaction product is contained in the reaction solution, and after removing the solvent, etc., the reaction product may be isolated and used. However, the reaction solution containing the foregoing reaction product may be used as it stands for the surface treatment agent for soft contact lens of the present invention.

The production of the reaction product may be performed by allowing the poly(meth)acrylic acid and the copolymer (P) to react with each other in the solution as mentioned above. Above all, it is preferred that the reaction product is obtained through the process including the following steps (i) to (iii), and at the same time, the surface treatment agent for soft contact lens of the present invention is prepared.

(i) Step in which a poly(meth)acrylic acid solution having the poly(meth)acrylic acid dissolved in a solvent and a surface treatment solution having the copolymer (P) dissolved in a solvent are separately prepared.

(ii) Step in which a soft contact lens is dipped in the aforementioned poly(meth)acrylic acid solution.

(iii) Step in which the soft contact lens is take out from the poly(meth)acrylic acid solution, the soft contact lens is dipped in the surface treatment solution to form the surface treatment solution as a reaction solution containing the poly(meth)acrylic acid, the copolymer (P), and the solvent into a reaction solution, and the poly (meth)acrylic acid and the copolymer (P) are allowed to react with each other in the reaction solution, thereby preparing a surface treatment agent for soft contact lens, containing the foregoing reaction product.

In the aforementioned step though the reaction product is produced in the reaction solution, the reaction solution containing the foregoing reaction product is corresponding to the surface treatment agent for soft contact lens of the present invention. In the aforementioned step (iii), the surface treatment of the soft contact lens is achieved along with the preparation of the surface treatment agent for soft contact lens.

A concentration of the poly(meth)acrylic acid in the poly(meth)acrylic acid solution in the step (i) is preferably 0.05 w/v % to 1.0 w/v %, more preferably 0.1 w/v % to 0.8 w/v %, and still more preferably 0.2 w/v % to 0.6 w/v %.

Examples of the solvent that dissolves the poly(meth) acrylic acid therein include water and an organic solvent. Although the organic solvent is not particularly limited, examples thereof include an ether-based solvent, such as tetrahydrofuran, a ketone-based solvent, such as acetone and N-methylpyrrolidone, an ester-based solvent, such as ethyl acetate, an alcohol, such as ethanol, and an amide-based solvent, such as dimethyl formamide, with an alcohol-based solvent being preferred.

As the solvent of the surface treatment solution in the aforementioned step (i), water is exemplified, and besides the water, an alcohol, such as ethanol, n-propanol, and isopropanol, may be contained. As the water, water that is typically used for medical and pharmaceutical products and medical instruments may be used. Specifically, ion exchange water, purified water, sterile purified water, distilled water, and water for injection may be used.

It is preferred that the surface treatment solution containing the copolymer (P) in the aforementioned step (i) contains a condensing agent. The kind of the condensing agent is the same as mentioned above. In addition, it is preferred that the surface treatment solution contains a buffer agent.

The concentrations of the copolymer (P), the condensing agent, and the buffer agent in the surface treatment solution are the same as the concentrations of these in the aforementioned reaction solution.

Although a dipping time in the aforementioned step (ii) is not particularly limited, it is preferably 0.1 to 6 minutes.

In the step though the soft contact lens clipped in the step (ii) may be taken out from the poly(meth)acrylic acid solution and dipped as it stands in the surface treatment solution, from the viewpoint of removing the excessive polymethacrylic acid, it is preferred that the soft contact lens is taken out from the poly(meth)acrylic acid solution, dipped in water, and then dipped in the surface treatment solution.

The kind of the solvent in the reaction solution in the step (iii) is the same as that in the solvent of the aforementioned surface treatment solution. In addition, the concentrations of the poly(meth)acrylic acid, the copolymer (P), the condensing agent, and the buffer agent in the reaction solution are the same as mentioned above.

[Other Component]

The surface treatment agent for soft contact lens of the present invention may contain, in addition to the reaction product obtained through a reaction of the poly(meth)acrylic acid and the copolymer (P), the following component(s) may be contained, as the need arises.

(Buffer Agent)

The surface treatment agent for soft contact lens of the present invention may contain a buffer agent. In view of the fact that the surface treatment agent for soft contact lens of the present invention contains the buffer agent, the pH and the osmotic pressure may be adjusted, and the soft contact lens may be inhibited from deformation.

In the present invention, from the viewpoint of obtaining the aforementioned effects, at least one buffer agent selected from a phosphate buffer solution, a 2-morpholinoethane sulfonate buffer solution, and a borate buffer solution may be used as the buffer agent.

The phosphate buffer solution as referred to in this specification is a buffer agent composed of disodium hydrogenphosphate, sodium dihydrogenphosphate, anhydrous sodium dihydrogenphosphate, potassium dihydrogenphosphate, dipotassium hydrogenphosphate, hydrochloric acid, sodium hydroxide, potassium hydroxide, or the like. The 2-morpholinoethane sulfonate buffer solution is a buffer solution composed of 2-morpholinoethane sulfonic acid. The borate buffer solution is a buffer solution composed of boric acid, borax, hydrochloric acid, sodium hydroxide, potassium hydroxide, or the like.

A concentration of the buffer agent of the surface treatment agent for soft contact lens of the present invention is preferably 0.0001 w/v % to 15.0 w/v %, more preferably 0.001 w/v % to 10.0 w/v %, and still more preferably 0.01 w/v % to 5.0 w/v %.

In particular, in the case where at least one selected from a phosphate buffer solution, a 2-morpholinoethane sulfonate buffer solution, and a borate buffer solution is used as the buffer agent, its concentration is preferably 0.001 w/v % to 10.0 w/v %, more preferably 0.01 w/v % to 5.0 w/v %, and still more preferably 0.1 w/v % to 5.0 w/v % in terms of a total of the components the phosphate buffer solution, the 2-morpholinoethan sulfonate buffer solution, and the borate buffer solution.

(Additive)

The surface treatment agent for soft contact lens of the present invention may further contain an additive, as the need arises.

As the additive, ones used for a conventional soft contact lens application may be exemplified, and examples thereof include an inorganic salt, an acid, a base, an antioxidant, a stabilizer, and an antiseptic.

Examples of the inorganic salt include sodium chloride, potassium chloride, magnesium chloride, and calcium chloride.

Examples of the acid include phosphoric acid and sulfuric acid.

Examples of the base include trishydroxymethyl aminomethane and monoethanolamine.

Examples of the antioxidant include tocopherol acetate and dibutylhydroxytoluene.

Examples of the stabilizer include sodium edetate and glycine.

Examples of the antiseptic include benzalkonium chloride, chlorhexidine gluconate, potassium sorbate, chlorobutanol, and polyhexanide hydrochloride.

From the viewpoint of giving moisture to the soft contact lens and enhancing the wearing feeling, the surface treatment agent for soft contact lens of the present invention may further contain polyethylene glycol, Poloxamer, sodium alginate, hydroxypropylmethyl cellulose, hydroxyethyl cellulose, sodium hyaluronate, chondroitin sulfate sodium, or the like.

Among these additives, from the viewpoint of adjusting the osmotic pressure of the soft contact lens to a suitable range, it is preferred to add sodium chloride or potassium chloride that is the inorganic salt. The inorganic salt may also be used as a physiological saline solution (for example, an ISO physiological saline solution) together with the buffer agent.

From the viewpoint of further reinforcing the effect for giving hydrophilicity and its sustainability to the soft contact lens, it is preferred to add polyethylene glycol, sodium alginate, Poloximer, hydroxypropylmethyl cellulose, hydroxyethyl cellulose, sodium hyaluronate, or chondroitin sulfate sodium.

In the case where the surface treatment agent for soft contact lens of the present invention contains the additive, its concentration is preferably 0.001 w/v % to 10.0 w/v %, and more preferably 0.001 w/v % to 7.0 w/v % in terms of a total of the additive components.

In particular, in the case where the surface treatment agent for soft contact lens of the present invention contains sodium chloride, its concentration is preferably 0.001 w/v % to 1.5 w/v %, more preferably 0.05 w/v % to 1.3 w/v %, and still more preferably 0.1 w/v % to 1.0 w/v %.

On the other hand, in the case where the surface treatment agent for soft contact lens of the present invention contains potassium chloride, its concentration is preferably 0.01 w/v % to 4.0 w/v %, more preferably 0.05 w/v % to 3.5 w/v %, and still more preferably 0.1 w/v % to 3.0 w/v %.

[Production Method of Surface Treatment Agent for Soft Contact Lens]

The production method of the surface treatment agent for soft contact lens of the present invention is not particularly limited. As mentioned above, after the poly(meth)acrylic acid and the copolymer (P) are allowed to react with each other in the reaction solution to produce a reaction product, the reaction product may be used as it stands as the surface treatment agent for soft contact lens, or after isolating the reaction product, the reaction product may be blended with the solvent and so on, to prepare the surface treatment agent for soft contact lens. Above all, it is preferred to produce the surface treatment agent for soft contact lens through a process including the steps (i) to (iii) as mentioned above.

[pH of Surface Treatment Agent for Soft Contact Lens]

A pH of the surface treatment agent for soft contact lens of the present invention is preferably 3.0 to 8.0, more preferably 3.5 to 7.8, still more preferably 4.0 to 7.6, and yet still more preferably 4.5 to 7.5 from the viewpoint of enhancing the efficiency of condensation reaction.

The pH of the surface treatment agent for soft contact lens in this specification refers to a value measured in accordance with the Japanese Pharmacopoeia, Seventeenth Edition, General Tests, Processes and Apparatus, 2.54 pH Determination.

[Osmotic Pressure and Osmotic Pressure Ratio of Surface Treatment Agent for Soft Contact Lens]

An osmotic pressure of the surface treatment agent for soft contact lens of the present invention is preferably 200 to 400 mOsm, more preferably 225 to 375 mOsm, still more preferably 230 to 350 mOsm, and yet still more preferably 240 to 340 mOsm from the viewpoint of enhancing the wearing feeling. An osmotic pressure ratio is preferably 0.7 to 1.4, more preferably 0.7 to 1.3, and still more preferably 0.8 to 1.2.

In this specification, the osmotic pressure of the surface treatment agent for soft contact lens refers to a value measured in accordance with the Japanese Pharmacopoeia, Seventeenth Edition, General Tests, Processes and Apparatus, 2.47 Osmolarity Determination, and the osmotic pressure ratio refers to a value obtained by dividing the obtained value of the osmotic pressure by the value of the osmotic pressure of a 0.9% by mass physiological saline solution (286 mOsm).

The surface treatment agent for soft contact lens of the present invention may enhance the surface hydrophilicity of soft contact lens as mentioned above and may reduce a feeling of dryness and discomfort of wearers. In consequence, the surface treatment agent for soft contact lens of the present invention is preferably used for a silicone hydrogel contact lens.

EXAMPLES

The surface treatment agent for contact lens of the present invention is hereunder specifically described by reference to Examples and Comparative Examples, but it should be construed that the present invention is not limited thereto. Copolymers and polymers used in the present Examples and Comparative Examples are as follows.

<Polyacrylic Acid>
Polyacrylic acid 1: Polyacrylic acid 5,000 (average molecular weight 5,000, manufactured by FUJIFILM Wako Pure Chemical Corporation)
Polyacrylic acid 2: Polyacrylic acid 25,000 (average molecular weight 25,000, manufactured by FUJIFILM Wako Pure Chemical Corporation)
Polyacrylic acid 3: Polyacrylic acid 250,000 (average molecular weight 250,000, manufactured by FUJIFILM Wako Pure Chemical Corporation)
Polyacrylic acid 4: Polyacrylic acid 1,000,000 (average molecular weight 1,000,000, manufactured by FUJIFILM Wako Pure Chemical Corporation)

<Copolymer (P)>
The following copolymer (P1) to copolymer (P5) were used as the copolymer (P).

Copolymer (P1)
A 2-methacryloyloxyethyl phosphorylcholine/2-aminoethyl methacrylate hydrochloride polymer (copolymer (P1)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P1): 92.5 mol %
Reactive monomer ($n_B$) in copolymer (P1): 7.5 mol %
Weight average molecular weight of copolymer (P1): 200,000

Copolymer (P2)
A 2-methacryloyloxyethyl phosphorylcholine/2-aminoethyl methacrylate hydrochloride polymer (copolymer (P2)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P2): 95.0 mol %
Reactive monomer ($n_B$) in copolymer (P2): 5.0 mol %

Weight average molecular weight of copolymer (P2): 210,000

Copolymer (P3)

A 2-methacryloyloxyethyl phosphorylcholine/2-aminoethyl methacrylate hydrochloride polymer (copolymer (P3)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P3): 97.5 mol %

Reactive monomer ($n_B$) in copolymer (P3): 2.5 mol %

Weight average molecular weight of copolymer (P3): 230,000

Copolymer (P4)

A 2-methacryloyloxyethyl phosphorylcholine/2-aminoethyl methacrylate hydrochloride polymer (copolymer (P4)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P4): 95.0 mol %

Reactive monomer ($n_B$) in copolymer (P4): 5.0 mol %

Weight average molecular weight of copolymer (P4): 270,000

Copolymer (P5)

A 2-methacryloyloxyethyl phosphorylcholine/2-aminoethyl methacrylate hydrochloride polymer (copolymer (P5)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P5): 95.0 mol %

Reactive monomer ($n_B$) in copolymer (P5): 5.0 mol %

Weight average molecular weight of copolymer (P5): 150,000

Copolymer (P6)

A 2-methacryloyloxyethyl phosphorylcholine/2-aminoethyl methacrylate hydrochloride polymer (copolymer (P6)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P6): 90.0 mol %

Reactive monomer ($n_B$) in copolymer (P6): 10.0 mol %

Weight average molecular weight of copolymer (P6): 300,000

Copolymer (P7)

A 2-methacryloyloxyethyl phosphorylcholine/2-aminoethyl methacrylate hydrochloride polymer (copolymer (P7)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P7): 80.0 mol %

Reactive monomer ($n_B$) in copolymer (P7): 20.0 mol %

Weight average molecular weight of copolymer (P7): 1,000,000

Copolymer (P8)

A 2-methacryloyloxyethyl phosphorylcholine/2-aminoethyl methacrylate hydrochloride polymer (copolymer (P8)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P8): 90.0 mol %

Reactive monomer ($n_B$) in Copolymer (P8): 10.0 mol %

Weight average molecular weight of copolymer (P8): 1,500,000

Copolymer (P9)

A 2-methacryloyloxyethyl phosphorylcholine/2-aminoethyl methacrylate hydrochloride polymer (copolymer (P9)) was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_B$) (molar number: $N_b$).

Hydrophilic monomer ($n_A$) in copolymer (P9): 90.0 mol %

Reactive monomer ($n_B$) in copolymer (P9): 10.0 mol %

Weight average molecular weight of copolymer (P9): 10,000

<Measurement of Weight Average Molecular Weight>

5 mg of each of the obtained copolymer (P1) to copolymer (P9) was dissolved in 1 g of a 0.1 mol/L sodium sulfate aqueous solution and subjected to GPC measurement. Other measurement conditions are as follows.

Column: Shodex (GSM-700)

Mobile phase: 0.1 mol/L sodium sulfate aqueous solution

Standard substance: Pullulan

Detector: Differential refractometer RI-8020 (manufactured by Tosoh Corporation)

Calculation method for weight average molecular weight: Molecular weight calculation program (GPC program for SC-8020)

Flow rate: 1.0 mL per minute

Injection volume: 100 μL

Column oven: 40° C.

Measurement time: 30 minutes

<Polymer for Comparison to Copolymer (P)>

The following polymer (A), polymer (B), polymer (C), and polymer (D) were each used as a polymer for comparison to the copolymer (P).

Polymer (A)

A 2-methacryloyloxyethyl phosphorylcholine homopolymer (weight average molecular weight: 200,000) was used.

Polymer (B)

A commercially available polydimethyldimethylenepyrrolidinium chloride solution (40% solution) (Polyquaternium-6, ME Polymer H40W (product name), manufactured by Toho Chemical Industry Co., Ltd., weight average molecular weight: 250,000) was used.

Polymer (C)

A 2-methacryloyloxyethyl phosphorylcholine/methacrylic acid copolymer (molar ratio: 2-methacryloyloxyethyl phosphorylcholine/methacrylic acid=3/7) (weight average molecular weight: 288,000) was used.

Polymer (D)

A 2-methacryloyloxyethyl phosphorylcholine/2-aminoethyl methacrylate hydrochloride copolymer was obtained using 2-(methacryloyloxy)ethyl 2-(trimethylammonio)ethyl phosphate (another name: 2-methacryloyloxyethyl phosphorylcholine) as the hydrophilic monomer ($n_A$) (molar number: $N_a$) and 2-aminoethyl methacrylate hydrochloride as the reactive monomer ($n_b$) (molar number of moles: $N_b$).

Hydrophilic monomer ($n_A$) in polymer (D): 40.0 mol %
Reactive monomer ($n_B$) in polymer (D): 60.0 mol %
Weight average molecular weight: 234,000

<Concentration Adjustment of Polymer>

The polymers were each subjected to the following concentration adjustment in advance for the purpose of facilitating the handling thereof during use in the Examples and Comparative Examples.

Copolymer (P1) to copolymer (P9): Each copolymer and purified water were used to adjust the concentration of the copolymer to 10 w/v %. The thus adjusted solution is described as "copolymer (P1) solution", etc. in each table.

Polymer (A): The polymer (A) and purified water were used to adjust the concentration of the polymer (A) to 5 w/v %.

Polymer (B): The polymer (B) was a 40 w/v % solution and used as it was.

Polymer (C): The polymer (C) and purified water were used to adjust the concentration of the polymer (C) to 5 w/v %.

Polymer (D): The polymer (D) and purified water were used to adjust the concentration of the polymer (D) to 10 w/v %.

<ISO Physiological Saline Solution>

The ISO physiological saline used in each of the Examples and Comparative Examples was prepared in the following manner.

An ISO physiological saline solution was prepared in accordance with ISO 18369-3:2006, Ophthalmic Optics-Contact Lenses Part 3: Measurement Methods. Specifically, 8.3 g of sodium chloride, 5.993 g of sodium hydrogen phosphate dodecahydrate, and 0.528 g of sodium dihydrogen phosphate dihydrate were dissolved in water, the total amount of the solution was adjusted to 1,000 mL, and the solution was filtered to obtain the ISO physical saline solution. The sodium chloride used was a product of Kishida Chemical Co., Ltd., the sodium hydrogen phosphate dodecahydrate used was a product of Wako Pure Chemical Industries, Ltd., the sodium dihydrogen phosphate dihydrate used was a product of Wako Pure Chemical Industries, Ltd., and the water used was ion exchange water.

<Contact Lens for Evaluation>

For the surface treatment, the following contact lenses were used.

(1) SEED 2weekFine UV, manufactured by Seed Inc. (composition: 2-HEMA, EGDMA, water content: 38%, FDA classification: I, oxygen permeability (Dk value): 12)

(2) 2 week ACUVUE, manufactured by Johnson & Johnson K. K. (composition: 2-HEMA, MMA, water content: 58%, FDA classification: IV, oxygen permeability (Dk value): 28)

(3) AIR OPTIX AQUA, manufactured by Nippon Alcon Co., Ltd. (composition: betacon, TRIS, DMA, water content: 33%, FDA classification: I (silicone hydrogel contact lens), oxygen permeability (Dk value): 138)

(4) Medalist FreshFit Comfort Moist, manufactured by B.L.J. Company, Ltd. (composition: monomer with a modified TRIS structure, NVP, water content: 36%, FDA classification: III, oxygen permeability (Dk value): 130)

The aforementioned (3) and (4) are corresponding to a silicone hydrogel contact lens.

<WBUT (Water Breaking Up Time) Test of Soft Contact Lens>

A WBUT test of a soft contact lens was performed in accordance with the following procedures.

(1) 10 mL or more of an ISO physiological saline solution was put into a 15 mL-centrifuge tube, and one soft contact lens treated in each of the Examples was put into in the foregoing 15 mL-centrifuge tube, followed by shaking for 2 hours.

(2) The ISO physiological saline solution in the centrifuge tube was removed, and 10 mL or more of an ISO physiological saline solution was again put thereinto, followed by shaking overnight.

(3) The soft contact lens was taken out from the 15 mL-centrifuge tube, water was gently wiped off, and the soft contact lens was placed in a contact lens case. 1 mL of an ISO physiological saline solution was put thereinto.

(4) The soft contact lens was picked up with tweezers and slowly lifted.

(5) Measurement of time was started at a point of time when the lifted soft contact lens was lifted to a height free of contact with a liquid surface.

(6) At a point of time point when a liquid film formed on the soft contact lens surface was broken up, the measurement of time was finished, and a time (second) of from the start of measurement of time to the finish of time was defined as a WBUT before cleaning by digital rubbing.

(7) After that, the soft contact lens was placed on a forefinger and subjected to cleaning by 20 times of digital rubbing using a thumb and the forefinger.

(8) After the cleaning by digital rubbing, the soft contact lens was dipped in a physiological ISO saline solution through the use of tweezers.

(9) The procedures of (4), (5), and (6) were performed again, to measure a WBUT after cleaning by digital rubbing.

Each measurement was repeated 3 times, and respective average values were evaluated as a WBUT (before cleaning by digital rubbing) and a WBUT (after cleaning by digital rubbing). The larger the numerical value of WBUT, the more favorable the hydrophilicity.

A WBUT of 5 seconds or more was judged as having surface hydrophilicity, a WBUT of 10 seconds or more was judged as having excellent surface hydrophilicity, and a WBUT of 15 seconds or more was judged as having extremely excellent surface hydrophilicity.

<Measurement of Oxygen Permeability of Soft Contact Lens>

The oxygen permeability of the soft contact lens was measured using Oxygen Permeometer Model 201T, manufactured by Createch/Rehder Dev. Co.

In each of the Examples, the measurement of oxygen permeability was performed with respect to the soft contact lens before and after treatment with the surface treatment agent.

Example 1

100 g of water and 0.976 g of 2-morpholinoethanesulfonic acid were previously weighed in a beaker and dissolved. To this solution, 20 g of the copolymer (P1) solution (10 w/v % aqueous solution) and 0.5 g of a water-soluble carbodiimide (1-ethyl-3-(3-dimethylaminopropyl)carbodiimide hydrochloride) were added and mixed, to prepare a surface treatment solution.

Separately, 100 g ethanol and 0.4 g of the polyacrylic acid 1 were charged in a beaker and mixed to prepare a polyacrylic acid solution. Ten contact lenses (1) for evaluation were put into the foregoing polyacrylic acid solution and dipped for 1 minute. Then, the contact lenses (1) for evaluation was taken out and put into 100 g of water, followed by further clipping for 1 minute.

After taking out the contact lenses (1) for evaluation from water, the contact lenses (1) for evaluation were put into the previously prepared surface treatment solution and dipped at 37° C. for 60 minutes, thereby preparing a surface treatment agent for soft contact lens, containing a reaction product resulting from a reaction between the polyacrylic acid 1 and the copolymer (P1) and also performing the surface treatment of the contact lenses (1) for evaluation with the foregoing surface treatment agent. Thereafter, the contact lenses (1) for evaluation were taken out and dipped in an ISO physiological saline solution, to provide a contact lens of Example 1.

With respect to the contact lens of Example 1, the <WBUT (Water Breaking Up Time) Test of Soft Contact Lens> was carried out. The evaluation results are shown in Table 1.

In producing the surface treatment agent for contact lens of Example 1, tracking of the reaction between the polyacrylic acid and the copolymer (P) was performed by means of $^{13}$C-NMR. As a result, new component other than the polyacrylic acid and the copolymer (P) was produced, and thus, it was confirmed that a reaction product was produced.

Example 2 to Example 20

The soft contact lenses of Examples 2 to 20 were each prepared in the same manner as in Example 1, except that the compositions of the polyacrylic acid solution, the surface treatment solution, and the surface treatment agent for soft contact lens, and the kind of the contact lens for evaluation used were changed as shown in Tables 1 to 3. With respect to the contact lenses of the respective Examples and the respective Comparative Examples, the <WBUT Test of Soft Contact Lens> was performed. The results are shown in Tables 1 to 3.

Comparative Example 1

The experiment was performed in the same manner as in Example 1, except that 20 g of a 5 w/v % aqueous solution of the polymer (A) was used in place of 20 g of the 10 w/v % aqueous solution of the copolymer (P1) used in Example 1. The results are shown in Table 4.

Comparative Example 2

The experiment was performed in the same manner as in Example 1, except that 20 g of a 40 w/v % aqueous solution of the polymer (B) was used in place of 20 g of the 10 w/v % aqueous solution of the copolymer (P1) used in Example 1. The results are shown in Table 4.

Comparative Example 3

The experiment was performed in the same manner as in Example 1, except that 20 g of a 5 w/v % aqueous solution of the polymer (C) was used in place of 20 g of the 10 w/v % aqueous solution of the copolymer (P1) used in Example 1. The results are shown in Table 4.

Comparative Example 4

The experiment was performed in the same manner as in Example 1, except that 20 g of a 10 w/v % aqueous solution of the polymer (D) was used in place of 20 g of the 10 w/v % aqueous solution of the copolymer (P1) used in Example 1. The results are shown in Table 4.

Comparative Example 5

The experiment was performed in the same manner as in Example 1, except that 1 g of a 10 w/v % aqueous solution of the polymer (D) was used in place of 20 g of the 10 w/v % aqueous solution of the copolymer (P1) used in Example 1. The results are shown in Table 4.

Comparative Example 6

The experiment was performed in the same manner as in Example 1, except that 40 g of a 10 w/v % aqueous solution of the polymer (D) was used in place of 20 g of the 10 w/v % aqueous solution of the copolymer (P1) used in Example 1. The results are shown in Table 4.

Comparative Example 7

The experiment was performed in the same manner as in Example 1, except that 0.05 g of the polyacrylic acid 1 was used in place of 0.4 g of the polyacrylic acid 1 used in Example 1, and that 20 g of a 10 w/v % aqueous solution of the polymer (D) was used in place of 20 g of the 10 w/v % aqueous solution of the copolymer (P1) used in Example 1. The results are shown in Table 4.

Comparative Example 8

The experiment was performed in the same manner as in Example 1, except that 1 g of the polyacrylic acid 2 was used in place of 0.4 g of the polyacrylic acid 1 used in Example 1, and that 20 g of a 10 w/v % aqueous solution of the polymer (D) was used in place of 20 g of the 10 w/v % aqueous solution of the copolymer (P1) used in Example 1. The results are shown in Table 4.

TABLE 1

| | | Example | | | | | | | |
|---|---|---|---|---|---|---|---|---|---|
| | | 1 | 2 | 3 | 4 | 5 | 6 | 7 | 8 |
| Polyacrylic acid solution (blending amount- g) | Ethanol | 100 | 100 | 100 | 100 | 100 | 100 | 100 | 100 |
| | Polyacrylic acid 1 | 0.4 | 0.4 | 0.4 | 0.4 | 0.2 | 0.8 | | |
| | Polyacrylic acid 2 | | | | | | | 0.4 | |
| | Polyacrylic acid 3 | | | | | | | | 0.4 |
| | Polyacrylic acid 4 | | | | | | | | |
| Surface treatment solution (blending amount: g) | Water | 100 | 100 | 100 | 100 | 100 | 100 | 100 | 100 |
| | 2-Morpholinoethane sulfonic acid | 0.976 | 0.976 | 0.976 | 0.976 | 0.976 | 0.976 | 0.976 | 0.976 |
| | Water-soluble carbodiimide | 0.5 | 0.5 | 0.5 | 0.5 | 0.5 | 0.5 | 0.5 | 0.5 |
| | Copolymer (P1) solution | 20 | 5 | 10 | 30 | 20 | 20 | 20 | 20 |
| | Copolymer (P2) solution | | | | | | | | |
| | Copolymer (P3) solution | | | | | | | | |
| | Copolymer (P4) solution | | | | | | | | |
| | Copolymer (P5) solution | | | | | | | | |
| | Copolymer (P6) solution | | | | | | | | |
| | Copolymer (P7) solution | | | | | | | | |
| | Copolymer (P8) solution | | | | | | | | |
| | Copolymer (P9) solution | | | | | | | | |
| | Contact lens for evaluation | (1) | (1) | (1) | (1) | (1) | (1) | (1) | (1) |
| WBUT test | Before cleaning by rubbing | 10 | 7 | 8 | 13 | 8 | 10 | 10 | 10 |
| | After cleaning by rubbing | 8 | 6 | 6 | 10 | 6 | 9 | 8 | 8 |

TABLE 2

| | | Example | | | | | | | |
|---|---|---|---|---|---|---|---|---|---|
| | | 9 | 10 | 11 | 12 | 13 | 14 | 15 | 16 |
| Polyacrylic acid solution (blending amount- g) | Ethanol | 100 | 100 | 100 | 100 | 100 | 100 | 100 | 100 |
| | Polyacrylic acid 1 | | 0.4 | 0.4 | 0.4 | 0.4 | 0.4 | 0.4 | 0.4 |
| | Polyacrylic acid 2 | | | | | | | | |
| | Polyacrylic acid 3 | | | | | | | | |
| | Polyacrylic acid 4 | 0.4 | | | | | | | |
| Surface treatment solution (blending amount: g) | Water | 100 | 100 | 100 | 100 | 100 | 100 | 100 | 100 |
| | 2-Morpholinoethane sulfonic acid | 0.976 | 0.976 | 0.976 | 0.976 | 0.976 | 0.976 | 0.976 | 0.976 |
| | Water-soluble carbodiimide | 0.5 | 0.5 | 0.5 | 0.5 | 0.5 | 0.5 | 0.5 | 0.5 |
| | Copolymer (P1) solution | 20 | | | | | 20 | 20 | 20 |
| | Copolymer (P2) solution | | 20 | | | | | | |
| | Copolymer (P3) solution | | | 20 | | | | | |
| | Copolymer (P4) solution | | | | 20 | | | | |
| | Copolymer (P5) solution | | | | | 20 | | | |
| | Copolymer (P6) solution | | | | | | | | |
| | Copolymer (P7) solution | | | | | | | | |
| | Copolymer (P8) solution | | | | | | | | |
| | Copolymer (P9) solution | | | | | | | | |
| | Contact lens for evaluation | (1) | (1) | (1) | (1) | (1) | (2) | (3) | (4) |
| WBUT test | Before cleaning by rubbing | 8 | 9 | 8 | 8 | 8 | 10 | 18 | 18 |
| | After cleaning by rubbing | 8 | 6 | 6 | 7 | 6 | 6 | 11 | 10 |

TABLE 3

| | | Example | | | |
|---|---|---|---|---|---|
| | | 17 | 18 | 19 | 20 |
| Polyacrylic acid solution (blending amount: g) | Ethanol | 100 | 100 | 100 | 100 |
| | Polyacrylic acid 1 | 0.4 | 0.4 | 0.4 | 0.4 |
| | Polyacrylic acid 2 | | | | |
| | Polyacrylic acid 3 | | | | |
| | Polyacrylic acid 4 | | | | |
| Surface treatment solution (blending amount: g) | Water | 100 | 100 | 100 | 100 |
| | 2-Morpholinoethane sulfonic acid | 0.976 | 0.976 | 0.976 | 0.976 |
| | Water-soluble carbodiimide | 0.5 | 0.5 | 0.5 | 0.5 |
| | Copolymer (P1) solution | | | | |
| | Copolymer (P2) solution | | | | |
| | Copolymer (P3) solution | | | | |
| | Copolymer (P4) solution | | | | |
| | Copolymer (P5) solution | | | | |

TABLE 3-continued

|  |  | Example | | | |
|---|---|---|---|---|---|
|  |  | 17 | 18 | 19 | 20 |
|  | Copolymer (P6) solution | 20 | | | |
|  | Copolymer (P7) solution | | 20 | | |
|  | Copolymer (P8) solution | | | 20 | |
|  | Copolymer (P9) solution | | | | 20 |
|  | Contact lens for evaluation | (4) | (4) | (4) | (4) |
| WBUT test | Before cleaning by rubbing | 18 | 14 | 15 | 11 |
|  | After cleaning by rubbing | 12 | 8 | 9 | 9 |

TABLE 4

|  |  | Comparative Example | | | | | | | |
|---|---|---|---|---|---|---|---|---|---|
|  |  | 1 | 2 | 3 | 4 | 5 | 6 | 7 | 8 |
| Polyacrylic acid solution (blending amount- g) | Ethanol | 100 | 100 | 100 | 100 | 100 | 100 | 100 | 100 |
|  | Polyacrylic acid 1 | 0.4 | 0.4 | 0.4 | 0.4 | 0.4 | 0.4 | 0.05 | |
|  | Polyacrylic acid 2 | | | | | | | | 1 |
|  | Polyacrylic acid 3 | | | | | | | | |
|  | Polyacrylic acid 4 | | | | | | | | |
| Surface treatment solution (blending amount- g) | Water | 100 | 100 | 100 | 100 | 100 | 100 | 100 | 100 |
|  | 2-Morpholinoethane sulfonic acid | 0.976 | 0.976 | 0.976 | 0.976 | 0.976 | 0.976 | 0.976 | 0.976 |
|  | Water-soluble carbodiimide | 0.5 | 0.5 | 0.5 | 0.5 | 0.5 | 0.5 | 0.5 | 0.5 |
|  | Polymer (A) solution | 20 | | | | | | | |
|  | Polymer (B) solution | | 20 | | | | | | |
|  | Polymer (C) solution | | | 20 | | | | | |
|  | Polymer (D) solution | | | | 20 | 1 | 40 | 20 | 20 |
|  | Contact lens for evaluation | (1) | (2) | (3) | (4) | (4) | (2) | (3) | (4) |
| WBUT test | Before cleaning by rubbing | 3 | 2 | 8 | 9 | 3 | 5 | 3 | 11 |
|  | After cleaning by rubbing | 1 | 1 | 3 | 3 | 1 | 1 | 2 | 4 |

The surface-treated contact lenses of Examples 1 to 20 were measured for the oxygen permeability after the surface treatment. The results are shown in Table 5.

TABLE 5

|  | Oxygen permeability (before treatment) | Oxygen permeability (before treatment) |
|---|---|---|
| Example 1 | 12 | 13 |
| Example 2 | 13 | 13 |
| Example 3 | 12 | 12 |
| Example 4 | 11 | 12 |
| Example 5 | 12 | 12 |
| Example 6 | 12 | 11 |
| Example 7 | 14 | 13 |
| Example 8 | 12 | 12 |
| Example 9 | 13 | 12 |
| Example 10 | 12 | 12 |
| Example 11 | 12 | 11 |
| Example 12 | 13 | 13 |
| Example 13 | 12 | 12 |
| Example 14 | 28 | 29 |
| Example 15 | 137 | 138 |
| Example 16 | 129 | 128 |
| Example 17 | 131 | 130 |
| Example 18 | 130 | 129 |
| Example 19 | 129 | 129 |
| Example 20 | 132 | 131 |

As is clear from the results shown in Tables 1 to 5, by using the surface treatment agent for soft contact lens, containing the reaction product obtained through a reaction between the polyacrylic acid and the copolymer (P) according to the present invention, excellent hydrophilicity and its sustainability to the soft contact lens surface may be given. In addition, it has been noted that during using the surface treatment agent for soft contact lens of the present invention for the silicone hydrogel contact lens, it exhibits extremely excellent hydrophilicity and its sustainability, it does not affect the oxygen permeability, and it is excellent in wearing feeling without affecting the oxygen permeability.

INDUSTRIAL APPLICABILITY

When the surface of soft contact lens is subjected to a hydrophilic treatment with the surface treatment agent for soft contact lens of the present invention, extremely excellent surface hydrophilicity may be given, and also the given surface hydrophilicity is excellent in the durability. Thus, it is possible to provide a soft contact lens with reduced discomfort and excellent feeling of wearing.

The invention claimed is:

1. A surface treatment agent for soft contact lens, comprising a condensation reaction product obtained through a reaction between a poly(meth)acrylic acid and a copolymer (P) in the presence of a condensing agent,
    wherein the poly(meth)acrylic acid has an average molecular weight of from 1,000 to 2,000,000,
    wherein the copolymer (P) is obtained through polymerization of a hydrophilic monomer ($n_A$) represented by the following formula (1) and a reactive monomer ($n_B$) represented by the following formula (2),
    wherein the copolymer (P) consists of the hydrophilic monomer ($n_A$) and the reactive monomer ($n_B$), and
    wherein in the copolymer (P), a content of the hydrophilic monomer ($n_A$) is from 80 to 99 mol %, a content of the reactive monomer ($n_B$) is from 1 to 20 mol %, and a weight average molecular weight of the copolymer (P) is from 10,000 to 5,000,000:

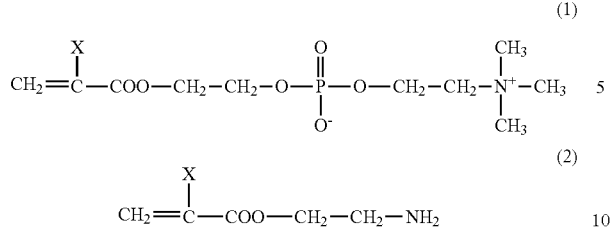

(1)

(2)

wherein X represents a hydrogen atom or a methyl group.

2. A surface treatment agent for a soft contact lens, wherein the soft contact lens is a silicon hydrogel contact lens, the surface treatment agent comprises:
- a condensation reaction product obtained through a reaction between a poly(meth)acrylic acid and a copolymer (P) in the presence of a condensing agent,
- wherein the poly(meth)acrylic acid has an average molecular weight of from 1,000 to 2,000,000,
- wherein the copolymer (P) is obtained through polymerization of a hydrophilic monomer ($n_A$) represented by the following formula (1) and a reactive monomer ($n_B$) represented by the following formula (2),
- wherein the copolymer (P) consists of the hydrophilic monomer (DA) and the reactive monomer ($n_B$), and
- wherein in the copolymer (P), a content of the hydrophilic monomer ($n_A$) is from 80 to 99 mol %, a content of the reactive monomer ($n_B$) is from 1 to 20 mol %, and a weight average molecular weight of the copolymer (P) is from 10,000 to 5,000,000:

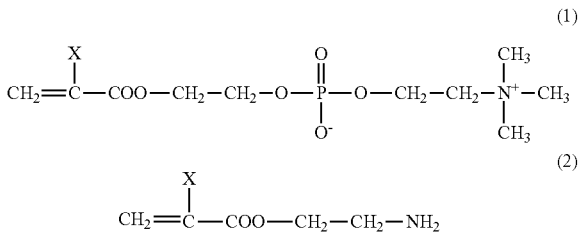

wherein X represents a hydrogen atom or a methyl group.

* * * * *